(12) United States Patent
Halabi

(10) Patent No.: US 9,605,703 B2
(45) Date of Patent: Mar. 28, 2017

(54) CLAMP DEVICE FOR VERTICAL PUMP COUPLING ALIGNMENT

(71) Applicant: Saudi Arabian Oil Company, Dhahran (SA)

(72) Inventor: Mohammad M. Halabi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 213 days.

(21) Appl. No.: 14/623,894

(22) Filed: Feb. 17, 2015

(65) Prior Publication Data

US 2016/0238048 A1 Aug. 18, 2016

(51) Int. Cl.
| | | |
|---|---|---|
| *G01B 5/20* | (2006.01) | |
| *F16B 7/04* | (2006.01) | |
| *F16B 2/06* | (2006.01) | |
| *F04D 13/10* | (2006.01) | |
| *F04D 29/62* | (2006.01) | |
| *F04D 29/64* | (2006.01) | |

(52) U.S. Cl.
CPC .......... *F16B 7/0426* (2013.01); *F04D 13/10* (2013.01); *F04D 29/628* (2013.01); *F04D 29/648* (2013.01); *F16B 2/065* (2013.01); *F05D 2230/64* (2013.01)

(58) Field of Classification Search
CPC .. F16B 7/04; F16B 7/0426; F16B 2/06; F16B 2/065; G01B 5/24; G01B 5/25; G01D 21/00
USPC .......................................................... 33/645
See application file for complete search history.

(56) References Cited

U.S. PATENT DOCUMENTS

| | | |
|---|---|---|
| 2,833,051 A | 5/1958 | Cunningham |
| 3,828,413 A | 8/1974 | Province et al. |
| 3,838,987 A | 10/1974 | Draut |
| 3,907,463 A | 9/1975 | Eller et al. |
| 4,106,393 A | 8/1978 | Dodson et al. |
| 4,161,068 A | 7/1979 | McMaster |

(Continued)

FOREIGN PATENT DOCUMENTS

| | | |
|---|---|---|
| EP | 0174288 A1 | 3/1986 |
| WO | 2012000112 A1 | 1/2012 |

OTHER PUBLICATIONS

International Search Report and Written Opinion for related PCT application PCT/US2016/018134 dated Jun. 8, 2016.

*Primary Examiner* — Yaritza Guadalupe-McCall
(74) *Attorney, Agent, or Firm* — Bracewell LLP; Constance Gall Rhebergen

(57) ABSTRACT

An alignment device for aligning a vertical pump shaft and coupling hub is provided. The alignment device includes a bracing sleeve comprising a connecting foot configured to removably attach to a connecting arm of a bolting ring, stabilizing nuts, stabilizing bolts, such that the stabilizing bolts screw through the stabilizing nuts to contact the shaft of the vertical pump to secure the bracing sleeve to the shaft of the vertical pump, and a grip pad configured to allow the bracing sleeve to fit flush with the shaft of the vertical pump. The alignment device also includes the bolting ring configured to adjust the coupling hub of the vertical pump, the bolting ring comprising guide nuts, guide bolts, such that the guide bolts screw through the guide nuts to contact the shaft to provide a means for adjusting the alignment between the vertical shaft and the coupling hub.

7 Claims, 4 Drawing Sheets

(56) References Cited

U.S. PATENT DOCUMENTS

| | | | |
|---|---|---|---|
| 4,367,594 A | 1/1983 | Murray, Jr. | |
| 4,534,114 A | 8/1985 | Woyton et al. | |
| 4,876,429 A | 10/1989 | Buchler | |
| 5,000,613 A | 3/1991 | Heald et al. | |
| 5,199,182 A | 4/1993 | Fowler | |
| 5,222,306 A | 6/1993 | Neumann | |
| 5,435,073 A | 7/1995 | Sullivan | |
| 5,480,193 A | 1/1996 | Echols et al. | |
| 6,171,195 B1 | 1/2001 | Ferguson | |
| 6,682,432 B1 * | 1/2004 | Shinozuka | F16B 2/065 403/222 |
| 6,752,560 B2 | 6/2004 | Wilson et al. | |
| 6,824,471 B2 | 11/2004 | Kamenov | |
| 7,111,407 B2 | 9/2006 | Jones | |
| 7,478,483 B2 * | 1/2009 | Wrzyszczynski | E21B 33/035 33/412 |
| 7,827,666 B2 * | 11/2010 | Harlon | G01B 5/25 29/407.01 |
| 8,047,577 B2 | 11/2011 | Zeiber | |
| 2006/0157536 A1 | 7/2006 | Wolf et al. | |
| 2007/0044337 A1 * | 3/2007 | Harlon | G01B 5/25 33/645 |
| 2007/0214670 A1 * | 9/2007 | Wrzyszczynski | E21B 33/035 33/412 |
| 2012/0047702 A1 | 3/2012 | Garrett, Jr. et al. | |
| 2016/0238048 A1 * | 8/2016 | Halabi | F16B 7/0426 |

* cited by examiner

CLAMP DEVICE FOR VERTICAL PUMP COUPLING ALIGNMENT

FIELD OF THE INVENTION

This invention relates to an apparatus and method for aligning a coupling hub of a vertical pump. More specifically, this invention provides an apparatus and a method for alignment of a vertical pump shaft with a motor shaft, where the alignment apparatus is not permanently installed.

BACKGROUND OF THE INVENTION

A pump is connected to a motor by a shaft, also known as a drive shaft. The shaft provides the torque necessary to turn the impeller of the pump. The shaft is usually two shafts: the motor shaft from the motor and the pump shaft from the pump. The two shafts are bolted together or coupled together at a coupling. The coupling or coupling nut can contain a coupling spacer. The coupling allows the two pieces, motor and pump, to be disconnected for maintenance.

All good maintenance programs have a process to ensure the shafts, and couplings are aligned within the allowed tolerances. Shaft alignment is critically important to the operation of the pump and motor equipment as misalignment increases the stress on the shafts contributing to wear and tear and potentially to failure.

There are various mechanical and digital means for detecting shaft alignment. A common system is a dial test indicator, or DTI, which typically contains a dial and an arm and measures the angular displacement. The angular displacement can be correlated to a linear distance.

Once a shaft misalignment is detected, the process of aligning the shafts can be primitive. A typical shaft realignment involves a hammer and piece of wood. An operator hammers the wood against the coupling or coupling spacer until alignment is reached by trial and error. Such a method takes significant time and has the potential for injury to the operators person.

Therefore, a method for bringing two shafts into alignment quickly that does not involve the potential for injury to a person is desired.

SUMMARY OF THE INVENTION

This invention relates to an apparatus and method for aligning a coupling hub of a vertical pump. More specifically, this invention provides an apparatus and a method for alignment of a vertical pump shaft with a motor shaft, where the alignment apparatus is not permanently installed.

In one aspect of the present invention, an alignment device for aligning a coupling hub of a vertical pump is provided. The alignment device includes a bracing sleeve defining a cylindrical opening extending through a central axis from a grip end to a clamp end of the bracing sleeve, the bracing sleeve having an internal surface, the bracing sleeve configured to secure to a motor hub of the coupling hub, the bracing sleeve including a connecting foot extending axially from the clamp end of the bracing sleeve, the connecting foot configured to removably attach to a connecting arm of a bolting ring, the connecting arm extending axially from a connection end of the bolting ring, a stabilizing attachment affixed to the clamp end of the bracing sleeve, the stabilizing attachment includes stabilizing nuts and stabilizing bolts, the stabilizing attachment configured to secure the bracing sleeve to the motor hub, wherein the stabilizing nuts are configured to receive the stabilizing bolts, and a grip pad mounted on the internal surface of the grip end of the bracing sleeve, the grip pad configured to allow the grip pad to fit flush with the motor hub, wherein the bracing sleeve is divided along its vertical axis into a plurality of curved sections with coupling means between each of the plurality of curved sections, wherein the coupling means is configured to secure two adjacent curved sections around the motor hub, and the bolting ring defining a cylindrical opening extending through a central axis from the connection end to a bolt end, the bolting ring configured to adjust alignment of a coupling nut of the coupling hub, the bolting ring including a guiding attachment affixed to the bolt end of the bracing sleeve, the guiding attachment includes guide nuts and guide bolts, wherein the bolting ring is divided along its vertical axis into a plurality of curved sections with coupling means between each of the plurality of curved sections, wherein the coupling means is configured to secure two adjacent curved sections around the coupling nut.

In certain aspects of the present invention, the coupling means for securing two adjacent curved sections of the bracing sleeve includes a tightening wing extending perpendicularly from each curved section of the bracing sleeve and a receiving wing extending perpendicularly from each curved section of the bracing sleeve, the tightening wing of one curved section configured to removably attach to the receiving wing of another curved section. In certain aspects of the present invention, the coupling means for securing two adjacent curved sections of the bolting sleeve includes a tightening wing extending perpendicularly from each curved section of the bolting sleeve and a receiving wing extending perpendicularly from each curved section of the bolting sleeve, the tightening wing of one curved section configured to removably attach to the receiving wing of another curved section.

In a second aspect of the present invention, a method for aligning a coupling hub using an alignment device is provided. The method includes the steps of securing the alignment device around the coupling hub, the alignment device including a bracing sleeve, the bracing sleeve defining a cylindrical opening extending through a central axis, the bracing sleeve divided into a plurality of curved sections around the central axis with a coupling means, the coupling means configured to secure the curved sections of the bracing sleeve together around a motor hub of coupling hub; and a bolting ring, the bolting ring defining a cylindrical opening extending through a central axis, the bolting ring divided into a plurality of curved sections around the central axis with a coupling means, the coupling means configured to secure the curved sections of the bolting ring together around the coupling nut, wherein a connecting foot extending axially from the bracing sleeve is removably attached to a connecting arm extending axially from the bolting ring, the step of securing the alignment device including placing the alignment device around the motor hub, wherein a grip pad on an internal surface of the bracing sleeve lies flush with the motor hub, tightening the coupling means of the bracing sleeve such that the bracing sleeve is secured around the motor hub, stabilizing the bracing sleeve against the motor hub by tightening a stabilizing attachment, and tightening the coupling means of the bolting ring such that the bolting ring is secured around the coupling hub, where there is a gap between the coupling nut and a plurality of guide bolts on a guiding attachment connected to the bolting ring, measuring an alignment between the coupling nut and the vertical pump shaft with an indicator, the indicator configured to provide an to produce an alignment reading, wherein the alignment reading is a measurement of displacement from a point, and adjusting the plurality of guide bolts to reposition the coupling nut based on the alignment reading.

In certain aspects of the present invention, the indicator is a dial test indicator. In certain aspects of the present invention, the method further includes the step of repeating the steps of measuring the alignment and the adjusting the plurality of guide bolts to reposition the coupling hub step until alignment is within a predetermined tolerance. In certain aspects of the present invention, the method further includes the step of measuring a baseline alignment value.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Figure 1:
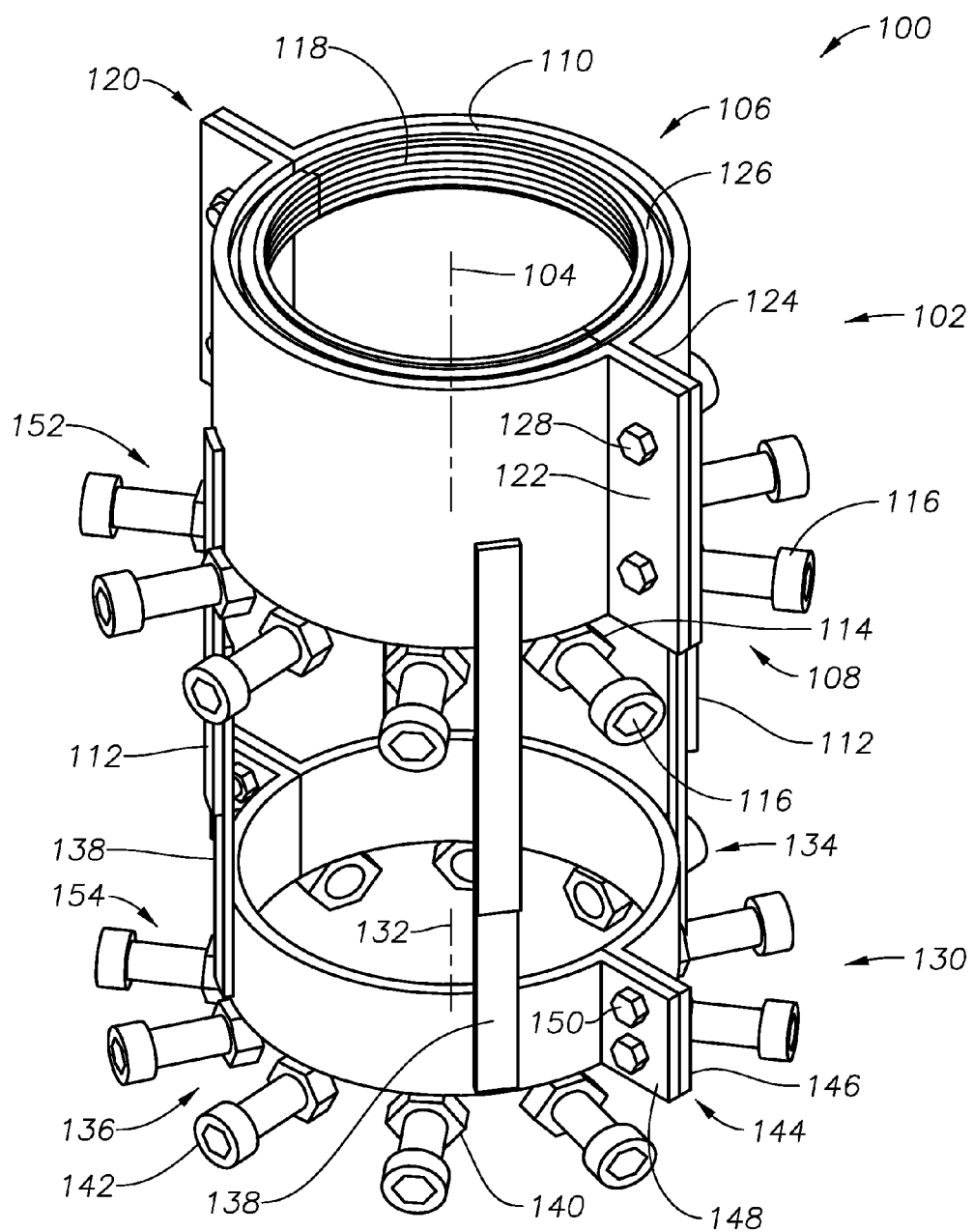
FIG. 1 is a schematic of an embodiment of the present invention.

Referring to FIG. 1, alignment device 100 for aligning the coupling hub of the vertical pump is provided. The coupling hub can include a motor shaft, a motor hub, a coupling nut, a pump hub, and a pump shaft. The coupling hub optionally can include a spacer. Alignment device 100 can be made of any materials suitable for the process conditions or available using any methods. Exemplary materials include metals, plastics, woods. Exemplary metals include cast iron, carbon steel, stainless steel, and other metals as known to one of skill in the art. Exemplary plastics include polyvinyl chloride (PVC), fiber reinforced plastic, polypropylene, polyethylene, high density polyethylene, polybutylene, acrylonitrile butadiene styrene (ABS), and other plastics as known to one of skill in the art. In at least one embodiment of the present invention, alignment device 100 is machined from carbon steel pipe. In at least one embodiment of the present invention, alignment device 100 is cast from a mold. Alignment device 100 can be any size as required by the coupling hub being aligned. Alignment device 100 can be sized in consideration of the diameter of the coupling hub and the total height of the coupling hub. In at least one embodiment of the present invention, alignment device 100 is fabricated from standard pipe sizes. In some embodiments, alignment device 100 is fabricated from sheet metal.

Alignment device 100 includes bracing sleeve 102 and bolting ring 130. Bracing sleeve 102 has grip end 106 and clamp end 108 and cylindrical opening extending through the central axis 104. Connecting foot 112 extends from clamp end 108. The length that connecting foot 112 extends is dependent on the size of the coupling hub and the length of the shaft. Connecting foot 112 can be attached to bracing sleeve 102 by any means known to one of skill in the art that will resist movement when connecting foot 112 is fastened with connecting arm 138. Exemplary means of attachment include welding, adhesives, riveting, fasteners. There can be one, two, three, four, or more connecting feet 112. In at least one embodiment, there are four connecting feet 112 extending from bracing sleeve 102. Connecting foot 112 can be designed to be adjustably fastened with connecting arm 138, such that the total height of alignment device 100 can be varied.

Grip pad 118 is installed on internal surface 110 at grip end 106. Grip pad 118 is designed to allow the grip pad to fit flush against the coupling hub to provide stability. Grip pad 118 has a no slip design and allows bracing sleeve 102 to hug the coupling hub at grip end 106. Grip pad 118 can be made of any material that can provide cushioning and grip. In at least one embodiment of the present invention, grip pad 118 is made of styrene butadiene rubber (SBR). To enhance the grip ability, grip pad 118 can be ridged, scored, cross-hatched or otherwise given texture. In one embodiment of the present invention, grip pad 118 is adhered to inner ring 126. Inner ring 126 is welded to inner surface 110 of bracing sleeve 102. In some embodiments of the present invention, grip pad 118 provides a cushion to fill in defects in the machining or fabrication of inner surface 110 or inner ring 126 so that there are no gaps between bracing sleeve 102 and the coupling hub.

Stabilizing attachment 152 is fixed to clamp end 104. Stabilizing attachment 152 can be attached by any means that will provide a stable connection to clamp end 104, allowing no movement. In at least one embodiment of the present invention, stabilizing attachment 152 is welded to clamp end 104. Stabilizing attachment 152 can be any means for securing bracing sleeve 102 around the coupling hub. Exemplary means for securing bracing sleeve include fasteners, straps, ties, clips, pins, clamps, bands, and rings. In at least one embodiment of the present invention, stabilizing attachment 152 includes stabilizing nuts 114 and stabilizing bolts 116. Stabilizing nuts 114 are attached to bracing sleeve 102 so that there is full clearance through stabilizing nuts 114 of stabilizing bolts 116. In at least one embodiment of the present invention, stabilizing bolts 116 are threaded fasteners that screw in through stabilizing nuts 114 to contact the shaft. Stabilizing bolts 116 should be flush against the shaft to hold bracing sleeve 102 in place against the coupling hub. Stabilizing nuts 114 and stabilizing bolts 116 can be off-the-shelf sizes or can be custom designed. The size, material of construction, and number of stabilizing nuts 114 and stabilizing bolts 116 are based on the diameter of the shaft, the diameter of bracing sleeve 102, and the need to keep bracing sleeve 102 from any movement once secured against the shaft. In at least one embodiment, stabilizing nuts 114 are ¾" heavy hex nuts made from carbon steel. In at least one embodiment of the present invention, stabilizing bolts 116 are ¾" socket head cap screw 3" long and fully threaded made from carbon steel. For every one stabilizing nut 114 there is one stabilizing bolt 116. There can be six stabilizing nuts 114, alternately eight stabilizing nuts 114, alternately ten stabilizing nuts 114, alternately twelve stabilizing nuts 114, and alternately more than twelve stabilizing nuts 114. Stabilizing nuts 114 are split evenly between the curved sections of bracing sleeve 102. In at least one embodiment of the present invention, bracing sleeve 102 contains ten stabilizing nuts 114 and ten stabilizing bolts 116. In an alternate embodiment of the present invention, bracing sleeve 102 is secured to the coupling hub with a band clamp.

Bracing sleeve 102 is divided along its vertical axis into a plurality of curved sections. In at least one embodiment, the curved sections of bracing sleeve 102 are fabricated by cutting a pipe into sections along one or more vertical planes. In at least one embodiment of the present invention, bracing sleeve 102 is divided into two curved sections, wherein the curved sections are mirror images. In an alternate embodiment of the present invention, bracing sleeve 102 is divided into four curved sections. The curved sections of bracing sleeve 102 include coupling means 120. Coupling means 120 secure the curved sections of bracing sleeve 102 together. Coupling means 120 can be any kind of coupling device known to removably attach curved sections. Coupling means 120 include, for example, threaded fasteners, clamps, buckles, hooks, straps, ties, clips, pins. In at least one embodiment of the present invention, each curved section of bracing sleeve 102 includes receiving wing 122 and tightening wing 124. Receiving wing 122 and tightening wing 124 extend perpendicularly from each curved section of bracing sleeve 102. Receiving wing 122 and tightening wing 124 are welded to each curved section of bracing sleeve 102. Receiving wing 122 and tightening wing 124 include holes for bolts to go through. Receiving wing 122 of one curved section and tightening wing 124 of another curved section are brought together such that wing fastener 128 can be used to secure the two curved sections together. In at least one embodiment, wing fastener 128 is a nut and threaded bolt, where the threaded bolt is passed through the hole of receiving wing 122 and into the hole of tightening wing 124 and the nut can be tightened along the threaded bolt securing the two curved sections together. In an alternate embodiment, the threaded bolt of wing fastener 128 is passed through the hole of tightening wing 124 and into the hole of receiving wing 122. In an alternate embodiment of the present invention, wing fastener 128 is an R-clip, where the straight leg of the R-clip is passed through the hole of receiving wing 122 and into the hole of tightening wing 124. In an alternate embodiment of the present invention, receiving wing 122 and tightening wing 124 are held together by clamps. One of skill in the art will appreciate that any means of securing two curved sections together can be used.

As described above, connecting foot 112 of bracing sleeve 102 is connected to connecting arm 138 of bolting ring 130. Bolting ring 130 has connection end 134, bolt end 136, and cylindrical opening extending through the central axis 132. Connecting arm 138 extends from connection end 134. The length that connecting arm 138 extends is dependent on the size of the coupling hub and the length of the coupling hub. Connecting arm 138 can be attached to bolting ring 130 by any means known to one of skill in the art that will resist movement when connecting arm 138 is fastened with connecting foot 112. Exemplary means of attachment include welding, adhesives, riveting, fasteners. In at least one embodiment of the present invention, connecting arm 138 is welded to bolting ring 130. In alternate embodiment of the present invention, connecting arm 138 is riveted to bolting ring 130. There can be one, two, three, four, or more connecting arms 138. In at least one embodiment, there are four connecting arms 138 extending from bolting ring 130.

Guiding attachment 154 is fixed to bolt end 136 of bolting ring 130. Guiding attachment 154 contacts the coupling hub, such that minor changes in position of guiding attachment translates to adjustments in the positioning of the coupling hub. Guiding attachment 154 can be any means that allow changes in positioning of guiding attachment 154 to translate to the coupling hub. In at least one embodiment of the present invention, guiding attachment 154 includes guide nuts 140 and guide bolts 142. Guide nuts 140 are fixed to bolt end 136 of bolting ring 130. Guide nuts 140 can be attached by any means that will provide a stable connection to bolt end 136, allowing no movement. In at least one embodiment of the present invention, guide nuts 140 are welded on bolt end 136. In an alternate embodiment of the present invention, guide nuts 140 are glued to bolt end 136. Guide nuts 140 are attached so as to provide full clearance through guide nuts 140 of guide bolts 142. Guide bolts 142, threaded fasteners, screw in through guide nuts 140 to contact the coupling hub. Guide nuts 140 and guide bolts 142 can be off-the-shelf sizes or can be custom designed. The size, material of construction, and number of guide nuts 140 and guide bolts 142 are based on the diameter of the coupling hub, the diameter of bolting ring 130, and the need to make slight adjustments to the alignment of the coupling hub. In at least one embodiment, guide nuts 140 are ¾" heavy hex nuts made from carbon steel. In at least one embodiment, guide nuts 140 are the same size and material as stabilizing nuts 114. In at least one embodiment, guide nuts 140 are a different size and material as stabilizing nuts 114. In at least one embodiment of the present invention, guide bolts 142 are ¾" socket head cap screws 3" long and fully threaded from carbon steel. In at least one embodiment, guide bolts 142 are the same size and material as stabilizing bolts 116. In at least one embodiment, guide bolts 142 are a different size and material as stabilizing bolts 116. For every one guide nut 140 there is one guide bolt 142. There can be six guide nuts 140, alternately eight guide nuts 140, alternately ten guide nuts 140, alternately twelve guide nuts 140, and alternately more than twelve guide nuts 140. The guide nuts are split evenly between the curved sections of bolting ring 130. In at least one embodiment of the present invention, bolting ring 130 contains ten guide nuts 140 and with ten guide bolts 142. In an alternate embodiment of the present invention, guide bolts 142 are dowels.

Bolting ring 130 is divided along its vertical axis into a plurality of curved sections. In at least one embodiment, the curved sections of bolting ring 130 are fabricated by cutting a pipe into sections along one or more vertical planes. In at least one embodiment of the present, bracing sleeve 102 is divided into two curved sections, wherein the curved sections are mirror images. The curved sections of bolting ring 130 include coupling means 144. Coupling means 144 secure the curved sections of bolting ring 130 together. Coupling means 144 can be any kind of coupling device known to removably attach curved sections. Coupling means 144 include, for example, threaded fasteners, clamps, buckles, hooks, straps, ties, clips, pins. In at least one embodiment of the present invention, each curved section of bolting ring 130 includes receiving wing 146 and tightening wing 148. Receiving wing 146 and tightening wing 148 extend perpendicularly from each curved section of bolting ring 130. Receiving wing 146 and tightening wing 148 are welded to each curved section of bolting ring 130. Receiving wing 146 and tightening wing 148 include holes for bolts to go through. Receiving wing 146 of one curved section and tightening wing 148 of another curved section are brought together such that wing fastener 150 can be used to secure the curved sections together. In at least one embodiment, wing fastener 150 is a nut and threaded bolt, where the threaded bolt is passed through the hole of receiving wing 146 and into the hole of tightening wing 148 and the nut is tightened securing the curved sections together. In an alternate embodiment, the threaded bolt of wing fastener 150 is passed through the hole of tightening wing 148 and into the hole of receiving wing 146. In an alternate embodiment of the present invention, wing fastener 148 is an R-clip, where the straight leg of the R-clip is passed through the hole of receiving wing 146 and into the hole of tightening wing 148. One of skill in the art will appreciate that any means of bringing the curved sections together can be used.

In at least one embodiment of the present invention, alignment device 100 is suitable for use when alignment is effected by runout. In at least one embodiment of the present invention, alignment device 100 is used to align piping runs. In at least one embodiment of the present invention, alignment device 100 is used to align piping runs prior to the piping runs being welded.

Figure 2:
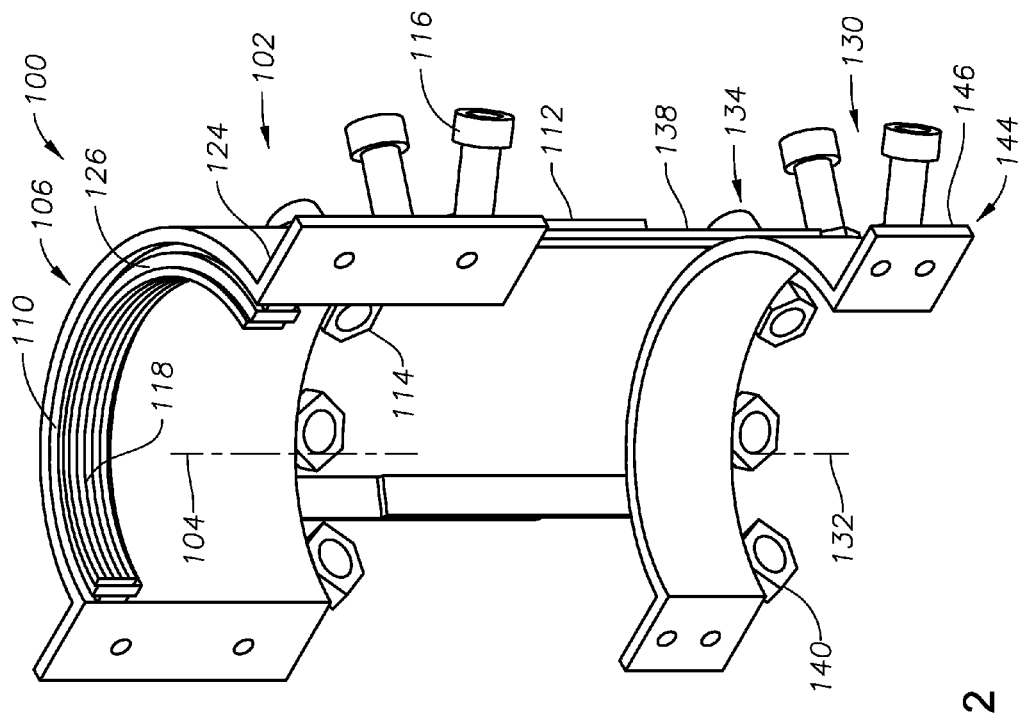
FIG. 2 is a sectional perspective view of an embodiment of the present invention.
Figure 2:
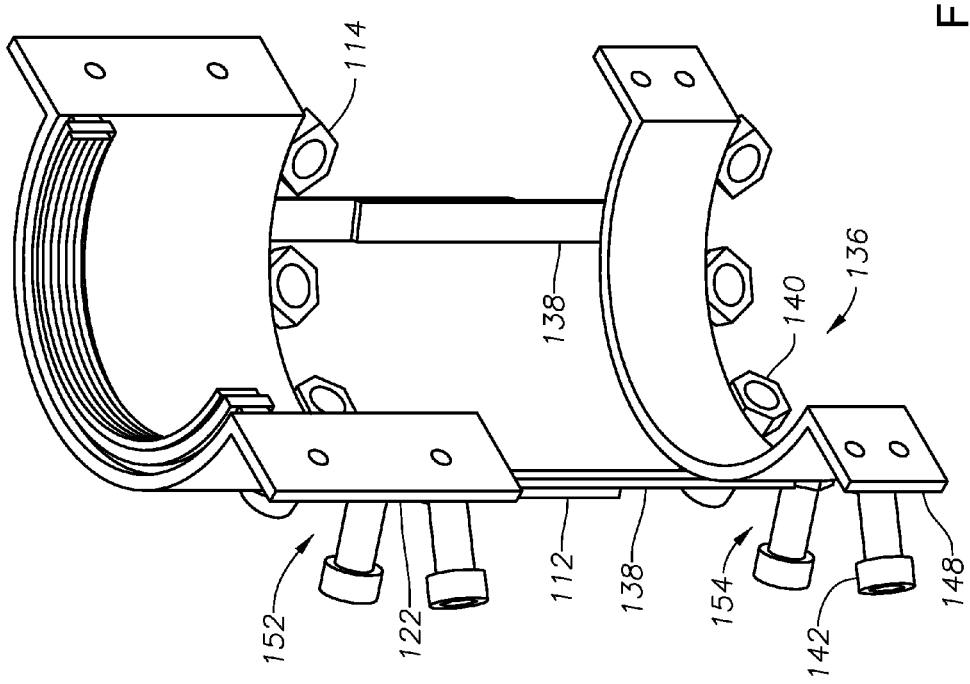
Figure 3:
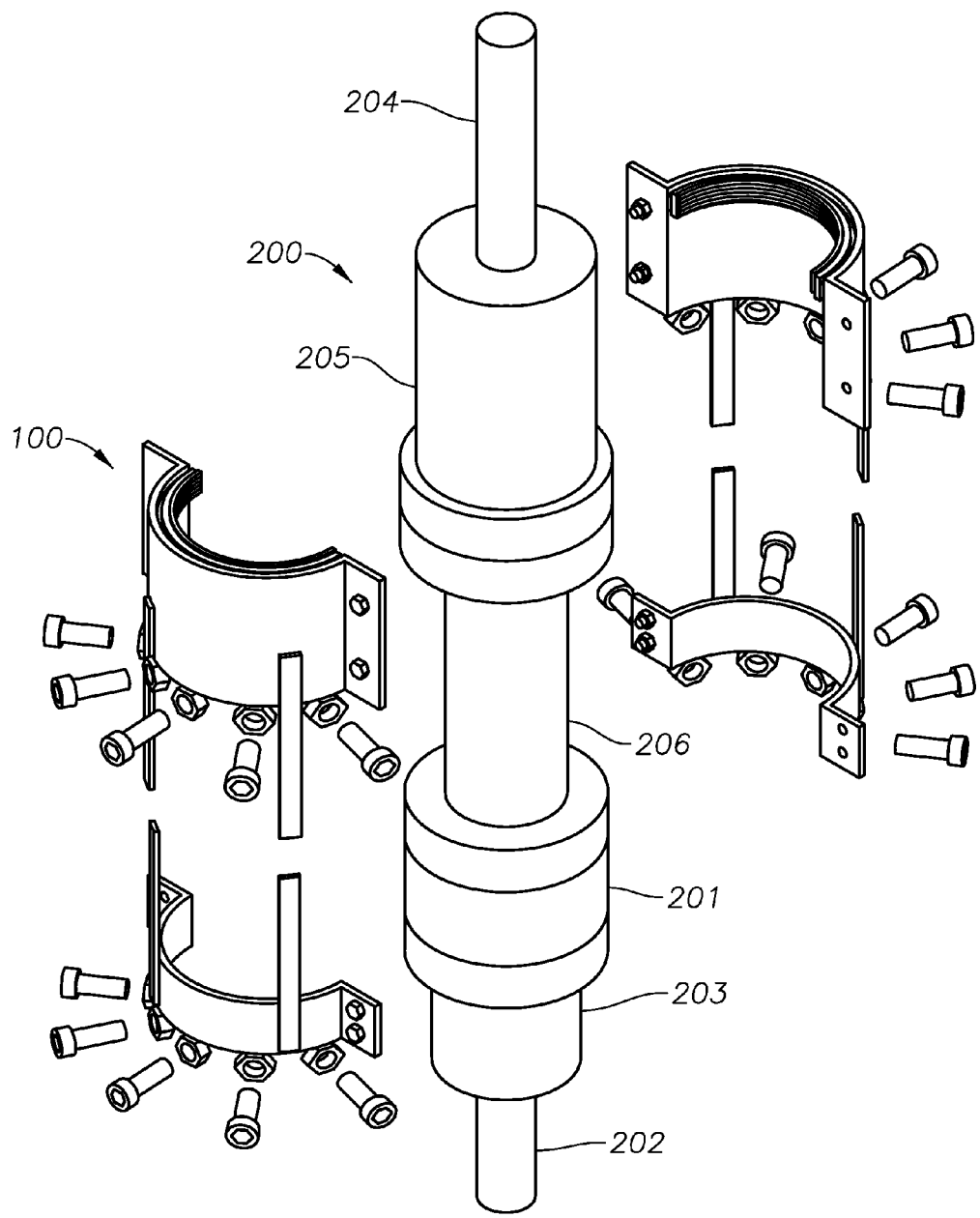
FIG. 3 is an exploded sectional perspective view of an alternate embodiment of the present invention.
Figure 4:
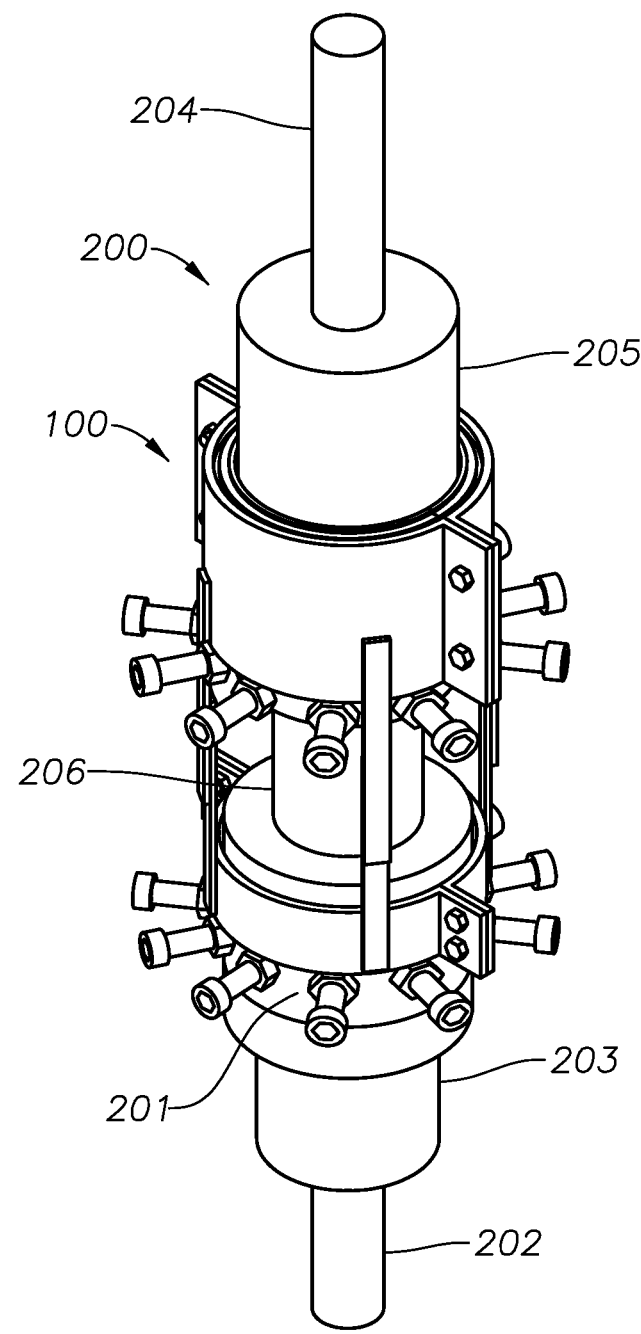
FIG. 4 is a sectional perspective view of an alternate embodiment of the present invention.

In a second aspect of the present invention, a method for aligning coupling hub 200 of vertical pump shaft 202 using alignment device 100 is provided. Coupling hub 200, as shown in FIG. 3, refers to the coupling of motor shaft 204 connected to motor hub 205 which connects to spacer 206. Spacer 206 then connects to coupling nut 201, which is between spacer 206 and vertical pump hub 203. Vertical pump hub 203 is connected to vertical pump shaft 202. The method is described herein with reference to FIGS. 1 and 2. Alignment device 100 is assembled so that connecting feet 112 are attached to connecting arms 138. The curved sections of bracing sleeve 102 and bolting ring 130 are placed around motor hub 205 and coupling nut 201 as shown in FIGS. 3-4. Once positioned such that bracing sleeve 102 sits flush against motor hub 205, coupling means 120 are brought together and wing fastener 128 is engaged to secure coupling means 120. Bracing sleeve 102 is stabilized against motor hub 205 by screwing stabilizing bolts 116 through stabilizing nuts 114 until stabilizing bolts 116 make contact with motor hub 205. In some embodiments of the present invention, stabilizing bolts 116 can be tightened until stabilizing bolts 116 grip motor hub 205.

After bracing sleeve 102 is secure, coupling means 144 on bolting ring 130 can be brought together so that wing fastener 150 can be tightened to secure coupling means 144. Tightening coupling means 144 places bolting ring 130 around coupling nut 201. Next, guiding attachment 154 on bolting ring 130 can be prepared to adjust coupling nut 201. Guide bolts 142 of guiding attachment 154 on bolting ring 130 are screwed through guide nuts 140 leaving a gap between guide bolts 142 and coupling nut 201. No part of alignment device 100 should be touching coupling nut 201 at this stage in the method.

Once alignment device 100 is secure around motor hub 205, an indicator can be used to measure the alignment of coupling nut 201 with vertical pump shaft 202, according to any known shaft alignment process. The indicator can be an analog or a digital indicator. The indicator can be designed to measure linear or angular displacement. In at least one embodiment of the present invention, a dial test indicator is used to measure and adjust alignment of coupling hub 200. The indicator can be used to indicate where coupling nut 201 needs to be adjusted and guide bolts 142 are used to methodically adjust coupling nut 201 as is needed based on the indicator readings. "Methodically" as used herein means that guide bolts 142 are tightened in turns around bolting ring 130 and they are incrementally tightened by a fraction at each turn. The result of "methodical" adjustment of coupling nut 201, is that the alignment of coupling nut 201 relative to vertical pump shaft 202 only changes by a few millimeters with each measurement on the indicator.

The steps of measuring the alignment of coupling nut 201 and vertical pump shaft 202 with the indicator and tightening guide bolts 142 to adjust the alignment of coupling nut 201 can be repeated until the alignment reading is within the allowed tolerance.

Alignment device 100 can be used to align other components of coupling hub 200. In alternate methods of using alignment device 100, bracing sleeve 102 can be secured to motor shaft 204, alternately motor hub 205, alternately spacer 206, alternately coupling nut 201, alternately vertical pump hub 203, and alternately vertical pump shaft 202. Depending on the location of bracing sleeve 102 on coupling hub 200, bolting ring 130 can be positioned such that guiding attachment 154 is positioned over motor hub 205, alternately spacer 206, alternately coupling nut 201, alternately vertical pump hub 203, alternately vertical pump shaft 202, and alternately motor shaft 204.

In an embodiment to measure and adjust alignment of coupling hub 200 the following steps are observed. Coupling nut 201 is installed between vertical pump hub 203 and spacer 206, with the bolts that secure coupling nut 201 to vertical pump hub 203 loose. In a first step of the embodiment, fit alignment device 100 around motor hub 205 and coupling nut 201 as described herein with reference to FIGS. 1-5, such that alignment device 100 is not touching coupling nut 201.

Next, mount a dial test indicator (DTI) so that the plunger is touching the vertical pump shaft 202 and the indicator dial is set to zero. With the DTI plunger still touching vertical pump shaft 202, rotate coupling hub 200 one turn, a full 360°, and observe indicator. Note where along the turn the highest negative reading occurs. Turn coupling hub 200 until the dial indicator rests at the point of the highest negative reading and re-set the dial indicator to zero. Rotate coupling hub 200 one turn, 360°, and observe indicator for the highest positive reading. At the point of highest positive reading on coupling nut 201, bring guide bolts 142 into contact with coupling nut 201 and continue tightening guide bolts 142 to move coupling nut 201 until the reading on the indicator is reduced by half. In at least one embodiment of the present invention, guide bolts 142 are tightened with a hex key, also known as an Allen wrench. In some embodiments of the present invention, a hex key can be used to push guide bolts 142 through guide nuts 140. In some embodiments of the present invention, a hex key can be used to screw guide bolts 142 through threads on guide nuts 140. Once the reading on the dial indicator has been reduced, tighten the bolts on opposite sides of coupling nut 201 in equal measures, for example tighten the bolts at 12 o'clock and then at 6 o'clock, followed by 3 o'clock and 9 o'clock and so on until all of the bolts have been tightened. Leave each of the bolts a little loose. Rotate coupling hub 200 one turn and check the runout, or Total Indicator Reading, using a standard runout procedure. Repeat the process above until the dial indicator reads zero (0) through an entire rotation of coupling hub 200. Remove alignment device 100 and the indicator.

In embodiments of the present invention, methods for aligning coupling hub 200 are based on the concept that alignment readings on an indicator of coupling hub 200 can provide an indication of where coupling hub 200 is out of alignment. Guide bolts 142 can be adjusted, by being tightened or loosened, depending on the reading, to reposition coupling hub 200 based on the alignment readings. In at least one embodiment of the present invention, an Allen wrench is used to adjust guide bolts 142. In at least one embodiment of the present invention, adjustments are made in the absence of a hammer. The adjustments in the position of guide bolts 142 may be minor, minor being one-eighth, one-quarter, or one-half turns of each bolt. In at least one embodiment of the present invention, the steps of measuring the alignment and adjusting guide bolts 142 are repeated until a reading on the dial test indicator shows alignment within a predetermined tolerance. In at least one embodiment of the present invention, the predetermined tolerance is provided by the pump manufacturer.

In at least one embodiment of the present invention, a baseline alignment value is measured. In some embodiments of the present invention, the step of measuring the alignment involves calculations based on the sag of the indicator, and the properties of the indicator.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed:

1. An alignment device for aligning a coupling hub of a vertical pump, the alignment device comprising:
   a bracing sleeve defining a cylindrical opening extending through a central axis from a grip end to a clamp end of the bracing sleeve, the bracing sleeve having an internal surface, the bracing sleeve configured to secure to a motor hub of the coupling hub, the bracing sleeve comprising:
      a connecting foot extending axially from the clamp end of the bracing sleeve, the connecting foot configured to removably attach to a connecting arm of a bolting ring, the connecting arm extending axially from a connection end of the bolting ring;
      a stabilizing attachment affixed to the clamp end of the bracing sleeve, the stabilizing attachment comprising stabilizing nuts and stabilizing bolts, the stabilizing attachment configured to secure the bracing sleeve to the motor hub, wherein the stabilizing nuts are configured to receive the stabilizing bolts; and
      a grip pad mounted on the internal surface of the grip end of the bracing sleeve, the grip pad configured to allow the grip pad to fit flush with the motor hub;
      wherein the bracing sleeve is divided along its vertical axis into a plurality of curved sections with coupling means between each of the plurality of curved sections, wherein the coupling means is configured to secure two adjacent curved sections around the motor hub; and
   the bolting ring defining a cylindrical opening extending through a central axis from the connection end to a bolt end, the bolting ring configured to adjust alignment of a coupling nut of the coupling hub, the bolting ring comprising:
      a guiding attachment affixed to the bolt end of the bracing sleeve, the guiding attachment comprising guide nuts and guide bolts,
      wherein the bolting ring is divided along its vertical axis into a plurality of curved sections with coupling means between each of the plurality of curved sections, wherein the coupling means is configured to secure two adjacent curved sections around the coupling nut.

2. The alignment device of claim 1, wherein the coupling means for securing two adjacent curved sections of the bracing sleeve comprises a tightening wing extending perpendicularly from each curved section of the bracing sleeve and a receiving wing extending perpendicularly from each curved section of the bracing sleeve, the tightening wing of one curved section configured to removably attach to the receiving wing of another curved section.

3. The alignment device of claim 1, wherein the coupling means for securing two adjacent curved sections of the bolting sleeve comprises a tightening wing extending perpendicularly from each curved section of the bolting sleeve and a receiving wing extending perpendicularly from each curved section of the bolting sleeve, the tightening wing of one curved section configured to removably attach to the receiving wing of another curved section.

4. A method for aligning a coupling hub using an alignment device, the method comprising the steps of:
   securing the alignment device around the coupling hub, the alignment device comprising:
      a bracing sleeve, the bracing sleeve defining a cylindrical opening extending through a central axis, the bracing sleeve divided into a plurality of curved sections around the central axis with a coupling means, the coupling means configured to secure the curved sections of the bracing sleeve together around a motor hub of coupling hub; and
      a bolting ring, the bolting ring defining a cylindrical opening extending through a central axis, the bolting ring divided into a plurality of curved sections around the central axis with a coupling means, the coupling means configured to secure the curved sections of the bolting ring together around the coupling nut, wherein a connecting foot extending axially from the bracing sleeve is removably attached to a connecting arm extending axially from the bolting ring,
   the step of securing the alignment device comprising:

placing the alignment device around the motor hub, wherein a grip pad on an internal surface of the bracing sleeve lies flush with the motor hub;

tightening the coupling means of the bracing sleeve such that the bracing sleeve is secured around the motor hub;

stabilizing the bracing sleeve against the motor hub by tightening a stabilizing attachment; and tightening the coupling means of the bolting ring such that the bolting ring is secured around the coupling hub, where there is a gap between the coupling nut and a plurality of guide bolts on a guiding attachment connected to the bolting ring;

measuring an alignment between the coupling nut and the vertical pump shaft with an indicator, the indicator configured to provide an to produce an alignment reading, wherein the alignment reading is a measurement of displacement from a point; and adjusting the plurality of guide bolts to reposition the coupling nut based on the alignment reading.

5. The method of claim 4, wherein the indicator is a dial test indicator.

6. The method of claim 4 further includes the step of repeating the steps of measuring the alignment and the adjusting the plurality of guide bolts to reposition the coupling hub step until alignment is within a predetermined tolerance.

7. The method claim 4 further comprising the step of measuring a baseline alignment value.

\* \* \* \* \*